United States Patent
Peterson

(10) Patent No.: US 7,413,313 B2
(45) Date of Patent: Aug. 19, 2008

(54) OPTICAL SHUTTER WITH ROTATIONAL AXIS IN LIGHT PATH OF PROJECTION DEVICE

(75) Inventor: Mark D. Peterson, Lake Oswego, OR (US)

(73) Assignee: Infocus Corporation, Wilsonville, OR (US)

( * ) Notice: Subject to any disclaimer, the term of this patent is extended or adjusted under 35 U.S.C. 154(b) by 234 days.

(21) Appl. No.: 10/987,867

(22) Filed: Nov. 12, 2004

(65) Prior Publication Data

US 2006/0103815 A1   May 18, 2006

(51) Int. Cl.
*G03B 21/14* (2006.01)
(52) U.S. Cl. .......................................... 353/97; 353/88
(58) Field of Classification Search .................. 353/80, 353/30, 97, 87, 88; 355/71; 348/742; 349/5, 349/7, 8
See application file for complete search history.

(56) References Cited

U.S. PATENT DOCUMENTS

| | | | |
|---|---|---|---|
| 5,083,209 A * | 1/1992 | Inoue et al. ................. 348/296 |
| 5,467,146 A | 11/1995 | Huang et al. | |
| 5,924,783 A * | 7/1999 | Jones ........................... 353/97 |
| 6,232,963 B1 | 5/2001 | Tew et al. | |
| 6,406,148 B1 * | 6/2002 | Marshall et al. ............... 353/31 |
| 6,637,894 B2 | 10/2003 | Dewald et al. | |
| 6,648,476 B2 * | 11/2003 | Watanabe et al. ............. 353/97 |
| 6,923,546 B2 * | 8/2005 | Kurematsu .................... 353/97 |
| 7,055,965 B2 * | 6/2006 | Koba ............................ 353/88 |
| 2003/0086265 A1 * | 5/2003 | Ilsaka et al. ................. 362/268 |
| 2005/0030492 A1 * | 2/2005 | Gishi .......................... 353/101 |
| 2005/0094112 A1 * | 5/2005 | Eguchi ........................ 353/111 |

OTHER PUBLICATIONS

"Display Category—New Technology: 4th Generation D.I.S.T." JVC, www.jvcdig.com/04_TV_highlight_DIST%20DILA.pdf, Jul. 2004, 13 pgs.

* cited by examiner

*Primary Examiner*—William C Dowling
(74) *Attorney, Agent, or Firm*—Schwabe Williamson & Wyatt

(57) ABSTRACT

An apparatus, system, and method for an optical shutter with a rotational axis in the light path of a projection device are disclosed herein.

22 Claims, 5 Drawing Sheets

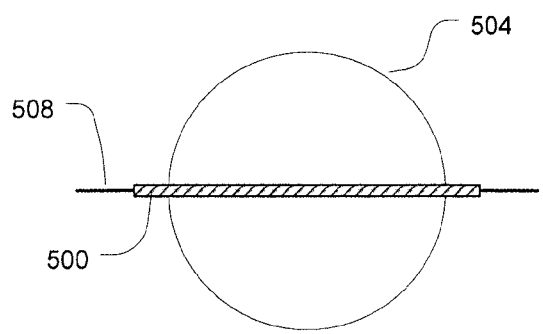
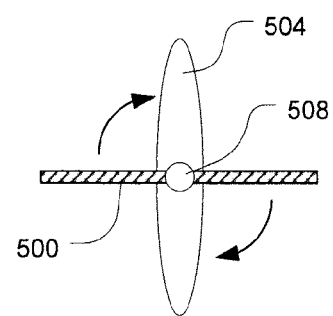
FIG. 5a FIG. 5b
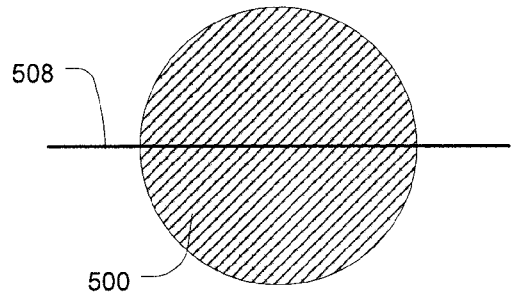
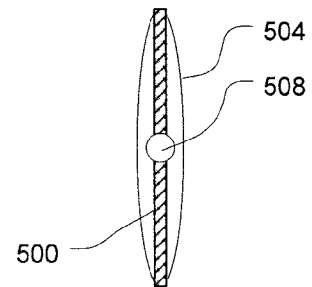
FIG. 6a FIG. 6b
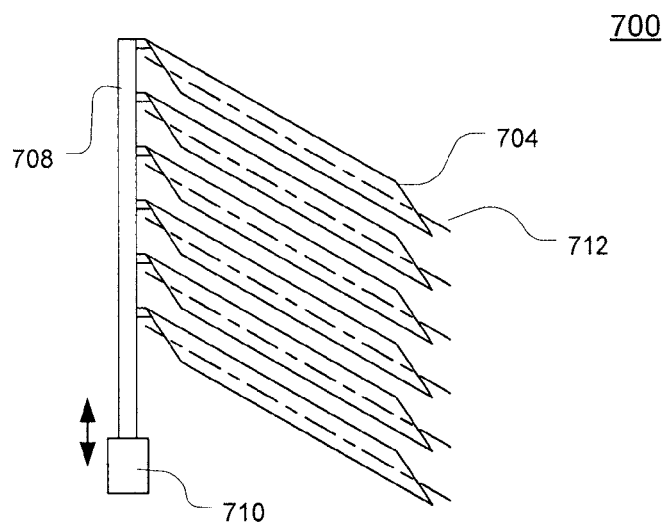
FIG. 7

OPTICAL SHUTTER WITH ROTATIONAL AXIS IN LIGHT PATH OF PROJECTION DEVICE

FIELD OF THE INVENTION

Embodiments of the invention relate generally to the field of projection systems, and more particularly to using an optical shutter with a rotational axis in the light path of a projection device.

BACKGROUND OF THE INVENTION

Multimedia projection systems have become popular for purposes such as conducting sales demonstrations, business meetings, classroom training, and for use in home theaters. In typical operation, multimedia projection systems receive analog video signals from an input device and convert the video signals to digital information to control one or more digitally driven light valves. Depending on the cost, brightness, and image quality goals of the particular projection systems, the light valves may be of various sizes and resolutions, be transmissive or reflective, and be employed in single or multiple display configurations.

Current projection systems are capable of creating millions of colors by using light valve pixels to selectively transmit or reflect primary colored light through a projection lens for viewing. However, current projection systems have difficulty reproducing frames with wide ranges in luminances from deep black to bright white, while still providing adequate resolutions. This is particularly noticeable in frames primarily composed of image pixels on the darker end of the luminance spectrum.

BRIEF DESCRIPTION OF THE DRAWINGS

Embodiments of the invention are illustrated by way of example and not by way of limitation in the figures of the accompanying drawings, in which like references indicate similar elements and in which:

FIGS. 5a-5b illustrate a front plan view and a side plan view, respectively, of an optical shutter in a light-passing orientation, in accordance with an embodiment of the present invention;

FIGS. 6a-6b illustrate a front plan view and a side plan view, respectively, of an optical shutter in a light-blocking orientation, in accordance with an embodiment of the present invention;

FIG. 7 illustrates an optical shutter assembly, in accordance with an embodiment of the present invention;

DETAILED DESCRIPTION

Illustrative embodiments of the present invention include an assembly providing an optical shutter with a rotational axis in a light path of a projection device, and methods practice thereon.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific materials and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments. In particular, a wide variety of optical components such as, but not limited to, prisms, mirrors, lenses, and integration elements may be used as appropriate to fold, bend, or modify the illumination for the intended application. Integration of these optical components into illustrated embodiments may not be specifically addressed unless it is necessary to develop relevant discussion of embodiments of the present invention.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

Figure 1:
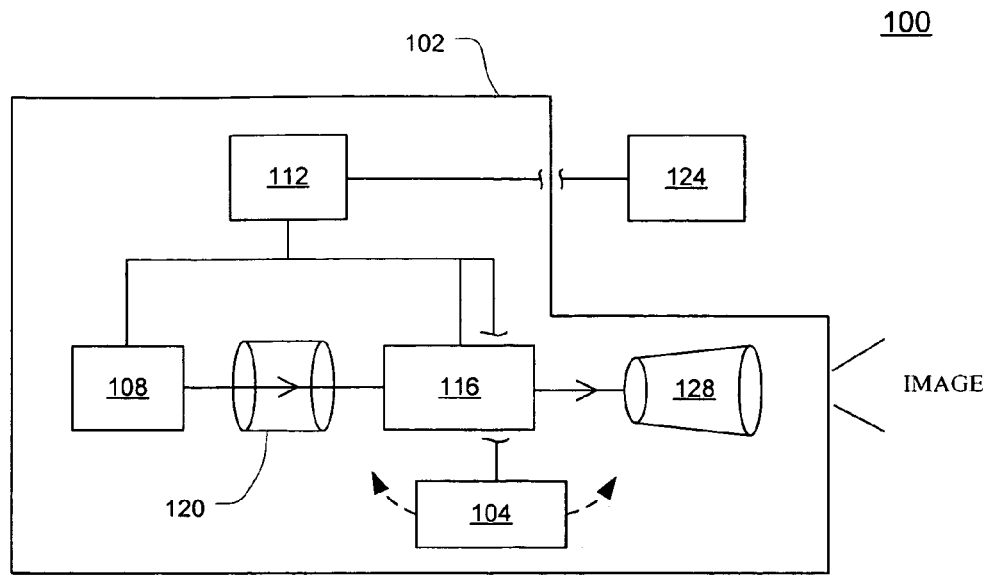
FIG. 1 is a simplified block diagram of a projection system, in accordance with an embodiment of the present invention.

FIG. 1 illustrates a simplified pictorial plan view of a projection system 100 including an optical shutter 104 with a rotational axis in the light path of a projection device 102, in accordance with an embodiment of the present invention. The projection device 102 may include a light source 108, coupled to a controller 112, to provide light to a light valve 116 along an illumination path. Illumination optics 120 may be positioned in the illumination path to facilitate the presentation of the incident, or non-image-bearing light, to the light valve 116. The illumination optics 120 may include, but are not limited to, illumination lenses, integration devices, and light-directing components.

The controller 112 may be adapted to transmit control signals to the light valve 116 based, at least in part, upon signals received from an input device 124. The control signals may cause matrix-addressable light valve pixels to modulate the non-image-bearing light into image-bearing light. The light valve 116 may direct, by reflection or transmission, the image-bearing light along a projection path. Image-bearing light may hereinafter also be referred to as modulated light. Projection optics 128 may be positioned somewhere along the projection path to facilitate the projection of the image, which may be image frames of a video, onto a screen or some other mechanism for viewing. The projection optics 128 may include, but is not limited to, projection lenses, imaging lenses, and light-directing components.

The controller 112 may also be coupled to the optical shutter 104, which may be in the illumination and/or the projection light path. For an image that is below a predetermined brightness value, the controller 112 may actuate the optical shutter 104 such that at least a portion of the light travelling along the light path is blocked. The resulting reduction of luminance may allow for more detail to be displayed in the darker image frames.

For the purpose of this description, a still image may be considered as a degenerate or special video where there is only one frame. Accordingly, both still image and video terminologies may be used in the description to follow, and they are not to be construed to limit the embodiments of the present invention to the rendering of one or the other.

The input device 124 may include a personal or laptop computer, DVD, set-top box (STB), video camera, video recorder, an integrated television tuner, or any other suitable device to transmit signals, e.g., video signals, to the projection device 102. In various embodiments, the system 100 may be, for example, a projector or a projection television.

In one embodiment the light source 108 may include a polychromatic light source such as a gaseous discharge lamp (e.g., high-pressure mercury, tungsten, halogen, or metal halide). In other embodiments, monochromatic light sources may be used to produce light of the desired color. Examples of monochromatic light sources that may be used include, but are not limited to, light-emitting diodes and laser diodes.

In one embodiment, the light valve 116 may include, e.g., a liquid crystal light valve. Examples of these types of light valves include, but are not limited to reflective displays such as LCOS (Liquid Crystal on Silicon) as well as transmissive displays, such as thin film transistor (TFT), polysilicon (P-Si), and Silicon-on-Insulator (SOI). In other embodiments, the light valve may have one or more digital micromirror displays (DMDs).

For every image frame, the controller 112 may assign an image pixel with an object color. In an embodiment having a single-path, frame sequential color (FSC) projection device 102, a display of the light valve 116 may be sequentially illuminated with primary colored light, e.g., red, green, and blue. Depending on the object color for the image pixel for the frame, the light valve pixel may pass on a calculated portion of light from each of the primary colors as image-bearing light, resulting in a series of primary color shades. The total possible primary color shades is related to the color depth of the system.

The color depth, or bit depth, is the number of bits allocated per pixel in a frame buffer memory of the controller 112 that determine the given pixel's object color for the frame. A larger color depth means that the system 100 may accommodate a greater number of object colors. However, a larger color depth also corresponds to increases in the amount of resources required by the system 100, e.g., memory, processor capabilities, etc. Common color depth values are 16- and 24-bits, although others may be used. A 24-bit color depth, which may also be referred to as "true color," may have, e.g., three bytes of storage per pixel per frame. For an embodiment with three primary colors, this results in 1 byte of data representing a quantization level of 256 different primary color shades. Upon viewing, the primary color shades may integrate into one of 16.7 million ($256^3$) possible object colors. In various embodiments different bit allocations resulting in different number of bits representing each primary color may be used.

For the purposes of this description, "quantization level" and "gray scale" may both refer to the number of shades that may be provided for a particular color per frame. While the illustrated embodiments may discuss object colors of white, shades of gray, and black, the principles discussed are equally applicable to colored light.

The light-processing characteristics of the light valve 116 may be explained as follows. Each time a light valve pixel is activated while being illuminated at 100% (or "full") luminance it may pass on 1 light unit as image-bearing light. This light processing may be substantially linear so that a 50% reduction in the luminance may result in ½ light unit being passed on as image-bearing light. It is important to note that 100% luminance is not a percentage of possible illumination from the light source 108, but rather it is used as a reference point for later discussion regarding a reduction in the luminance. Additionally, in various embodiments a pixel may be energized to be in an on-state, while in other embodiments a pixel may be energized to be in the off-state. An activated pixel, as used herein, is a pixel that is in the on-state to pass on light as image-bearing light, regardless of its un-energized biased state.

Figure 2A:
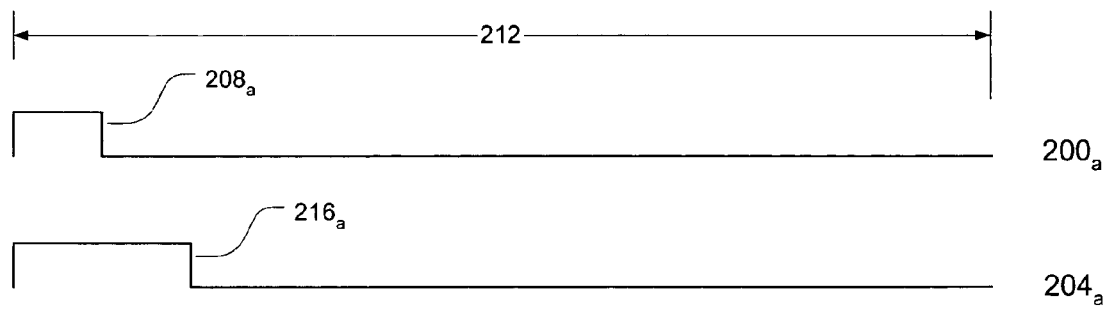
FIGS. 2a-2b illustrate waveform graphs of light valve pixel control signals, in accordance with an embodiment of the present invention.

The controller 112 may develop light valve pixel control signals (hereinafter, also referred to as "control signals") to effectuate the pixel directing the appropriate amounts of modulated light along the projection path in order to render the desired object color. FIG. 2a illustrates waveform graphs of two control signals $200_a$ and $204_a$ for two different pixels, in accordance to an embodiment of the present invention. In this embodiment, the control signal $200_a$ may have an activation period $208_a$ corresponding to a gray scale value of 10/255. That is, the light valve pixel controlled by the control signal $200_a$ may be activated 10 out of a possible 255 times per frame 212. The control signal $204_a$ may have an activation period $216_a$ corresponding to a gray scale value of 20/255.

The light valve pixels of this embodiment are activated only for a small portion of the total frame period 212, with the light being unused in the remaining portion. Therefore, in this embodiment the optical shutter 104 may be used to block a portion of the total luminance in the projection device so that the activation periods $208_a$ and $216_a$ may be extrapolated over a greater portion of the frame. This may, in turn, lead to better gray scale resolution of the dark scenes.

Figure 2B:
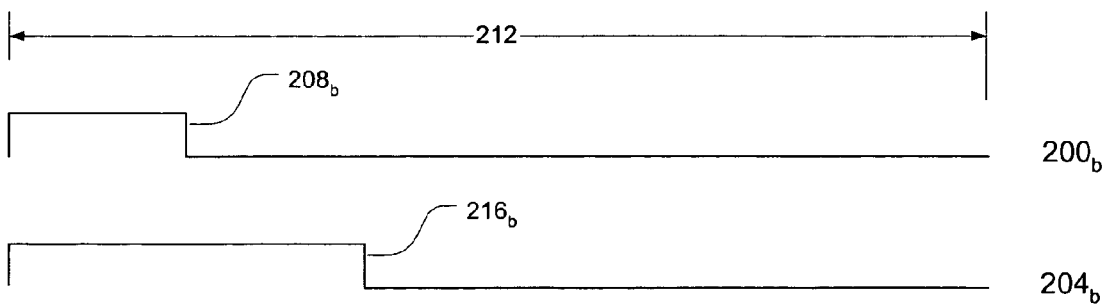

FIG. 2b illustrates modified control signals $200_b$ and $204_b$ in accordance with one embodiment of the present invention. In this embodiment, the optical shutter 104 may block approximately 50% of the total illumination in the projection device 102. While the controller 112 may still activate each pixel 0-255 times per frame, these 256 values are now available for the darker half of the pixels, e.g., the pixels that were activated less than 128 times at full luminance. This may provide the darker pixels with twice as many shades as before. In one embodiment, activation period $208_b$ may now correspond to a gray scale value of, for example, 19/255, which would provide 9.5 light units of image-bearing light, a quantity that was previously unavailable at full luminance. Likewise, activation period $216_b$ may also correspond to a shade that more closely approximates the desired image pixel shade, e.g., 41/255, or 20.5 light units.

In various embodiments, light valve 116 may have displays with a large number of pixels. For example, a DMD may have hundreds of thousands of mirrors, each corresponding to an individual image pixel. With each of these image pixels capable of having any of the gray scale values, there may be a wide range of gray scale values in each image frame. These gray scale values may be used to develop a total integrated image brightness value for the frame. This image brightness value may be compared to a predetermined image brightness threshold value to determine the desirability of operating the optical shutter 104.

Figure 3A:
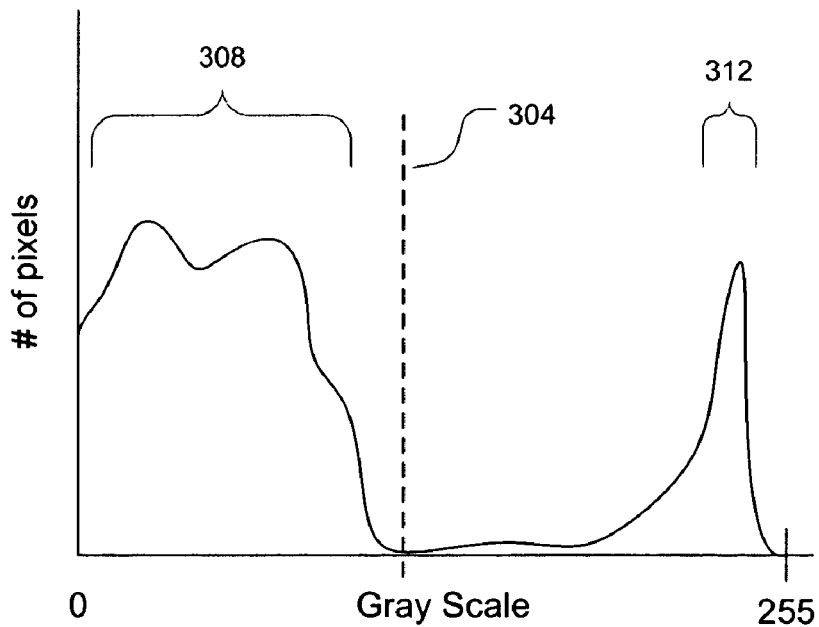
FIGS. 3a-3b illustrate line graphs depicting the number of pixels having different gray scale levels before and after a reduction in total luminance, in accordance with an embodiment of the present invention.

FIG. 3a illustrates a graph 300 depicting the range of gray scale levels for image pixels for a frame period, in accordance with an embodiment of the present invention. For this embodiment, each of the image pixels is assigned a gray scale value between 0-255. As shown, this frame period includes a majority of the pixels having gray scale levels less than a certain predetermined threshold value 304. The threshold value 304 may be a benchmark value that is compared to a like-dimension image brightness value that is based, at least in part, on the image data. In various embodiments, the image brightness value may be an average of all of the gray scale values, a total aggregate gray scale, or some other brightness indicator. In other embodiments, other statistical operations may be used to determine whether an image frame would benefit from a reduction of the total illumination and an extrapolation of the pixel data across the frame period.

In the present embodiment, pixels within a certain range of gray scales (e.g., 0-50) may be referred to as dark pixels 308, and pixels having gray scale ranges from, e.g., 240-250, may be referred to as light pixels 312. As shown in FIG. 3a, this image frame consists of a large number of dark pixels 308 with substantially fewer light pixels 312. In this embodiment, the optical shutter 104 may be employed to downwardly adjust the total luminance in order to facilitate an increase in the resolution of the dark pixels 308.

Figure 3B:
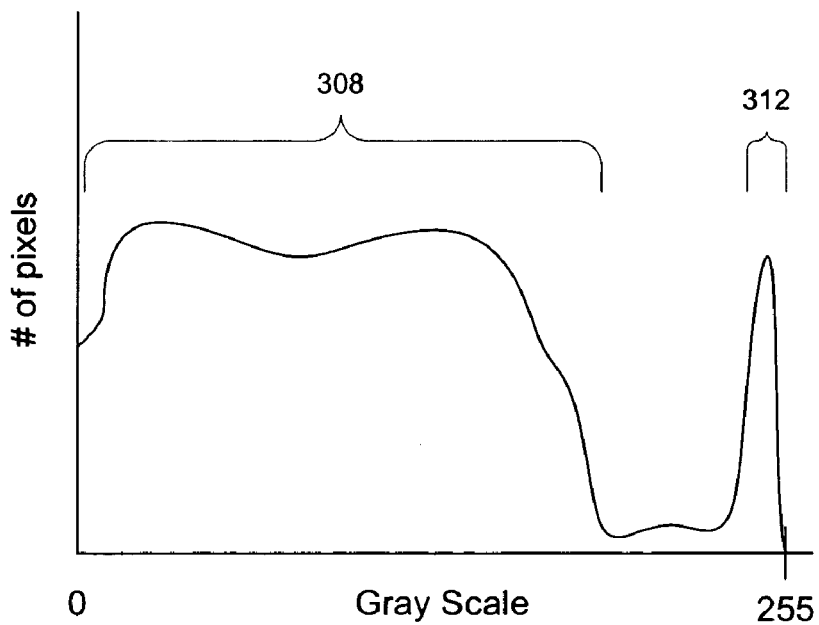

FIG. 3b illustrates a graph depicting the range of gray scale levels for the image pixels for the same frame period as FIG. 3a after the optical shutter 104 has adjusted the total luminance, in accordance with an embodiment of the present invention. In this embodiment, the optical shutter 104 may reduce the total luminance by a certain percentage, e.g., 50%. The dark pixels 308 may then be extrapolated out over a larger range of gray scales (e.g., 0-100) thereby providing an opportunity for greater resolution for the dark pixels 308.

In one embodiment, the light pixels 312 may be upwardly adjusted with the same distribution range (245-255). This may provide the same bit depth resolution amongst the light pixels 312 as before adjustment. In another embodiment, the light pixels 312 may be upwardly adjusted with a compressed distribution range (e.g., 250-255). This may provide greater contrast between the light pixels 312 and the dark pixels 308 compared to the previous embodiment. Other embodiments may use other techniques or variations on the above-described techniques that may be suitable for the particular objectives of the various embodiments.

In some embodiments, the total light units passed on by the light pixels 312 may be less than the original frame period. In an embodiment having a 50% reduction in total luminance, any pixel having an original gray scale of more than ½ the gray scale range (128) may not be able to achieve the originally transmitted light units. However, in a dark image frame this lack of brightness over a relatively small number of pixels should not have a deleterious effect on the image quality, as the light pixels 312 should still be significantly contrasted against the rest of the image.

Figure 4:
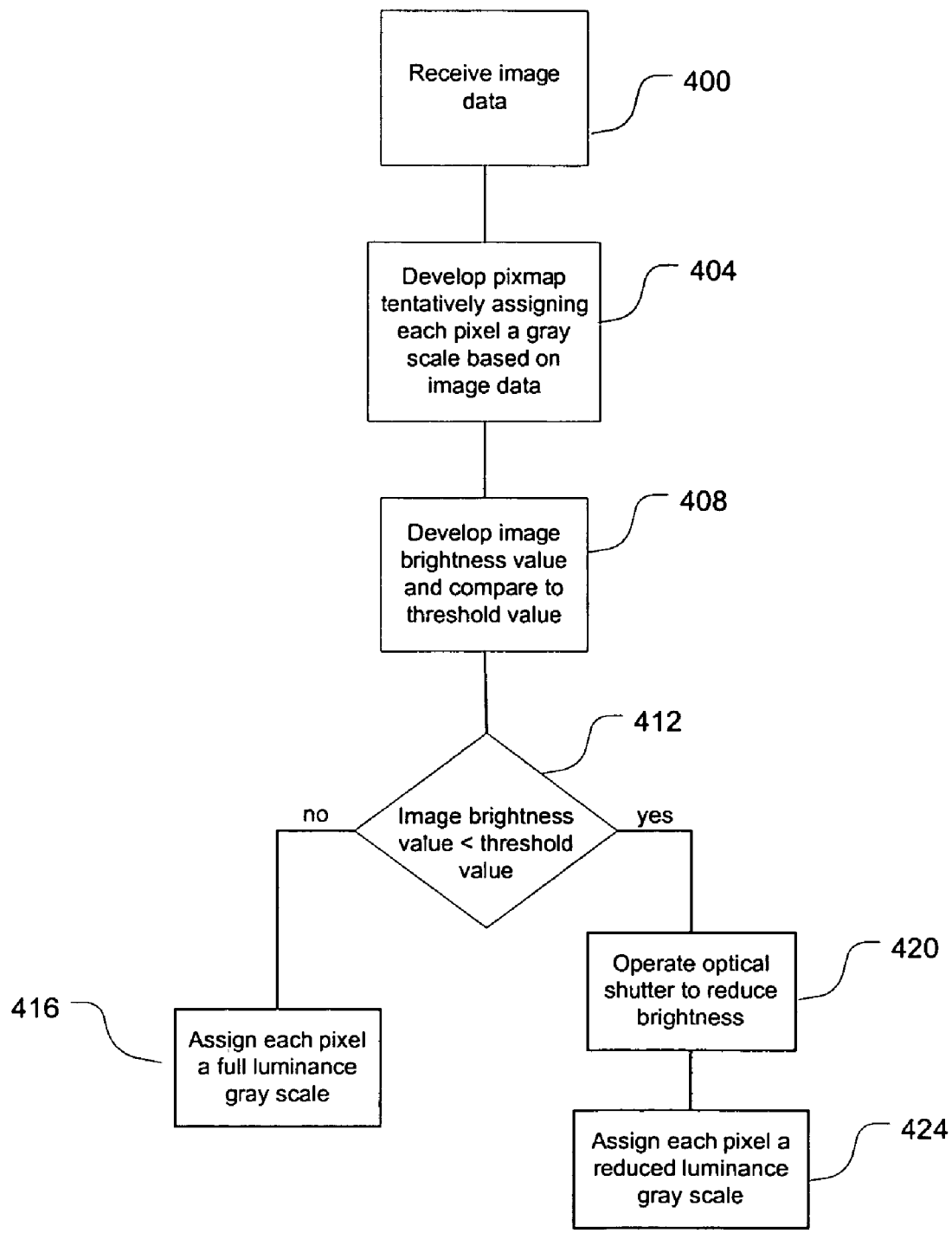
FIG. 4 illustrates a methodology for developing pixel control signals, in accordance with an embodiment of the present invention.

FIG. 4 illustrates a methodology for developing pixel control signals, in accordance with one embodiment of the present invention. The methodology of this embodiment may be implemented by components similar to those described and discussed with reference to FIG. 1. In the present embodiment, a controller may receive image data from an input device 400. The controller may then develop a pixmap, where the image data is processed and each image pixel is tentatively assigned a full luminance gray scale value 404. An image brightness value may be developed based on a statistical analysis of the pixmap. This image brightness value may be compared to a predetermined threshold value 408. If the image brightness value is greater than the threshold value 412, the controller may assign each pixel the full luminance gray scale value 416. If, however, the image brightness value is less than the threshold value 412, the controller may actuate an optical shutter to reduce the overall luminance 420 and assign each of the pixels a reduced luminance gray scale value 424.

FIGS. 5a and 5b illustrate a front plan view and a side plan view, respectively, of an optical shutter 500 in a light-passing orientation in accordance with an embodiment of the present invention. In this embodiment, the optical shutter 500 may be positioned at or near a pupil 504 with a profile designed to allow a significant portion of light to pass through the pupil 504. The pupil 504 may be found in or around the projection optics along the projection path or the illumination optics along the illumination path.

The optical shutter 500 may be rotationally secured on an axis 508 that is positioned in the light path. By positioning the rotational axis 508 in the light path, the slightest rotation of the shutter 500 may decrease the amount of light passing through the pupil 504. This may facilitate a quicker response time to accommodate rapidly changing images. In one embodiment, the shutter 500 may be rotated by a mechanical actuator (not shown) coupled to an edge of the shutter 500 or the rotational axis 508. The mechanical actuator may result from electromagnetic and piezoelectric forces. In other embodiments, other actuators may be employed to operate the shutter 500 in a similar fashion.

FIGS. 6a and 6b illustrate a front plan view and a side plan view, respectively, of the optical shutter 500 in a light-blocking orientation in accordance with an embodiment of the present invention. In this embodiment, the shutter 500 is fully actuated such that the entire pupil is blocked. The light blocking orientation of this embodiment may be used in a frame, or portion thereof, that is black. This may facilitate having a true black projection that current projection systems have difficulty with due to scattered light unintentionally entering into projection optics. Other embodiments may only block part of the pupil 504 by partially actuating the shutter 500. These embodiments may rotate the shutter 500 to a degree commensurate with a desired proportional reduction in luminance.

In this embodiment, the optical shutter 500 may be of a geometrical design similar to the pupil 504, e.g., circular. However, in various embodiments, some of which will be discussed later, the geometrical design may be adapted to provide light blocking characteristics desirable for a particular application.

FIG. 7 illustrates an optical shutter assembly 700 in accordance with an embodiment of the present invention. In this embodiment a number of shutters 704 may be disposed substantially parallel to one another and may each be attached to an actuating arm 708. Linear motion from the actuating arm 708 may cause the shutters 704 to rotate around individual rotational axes 712 to any position between a light-blocking and a light-passing orientation. The rotational axes 712 may be secured by a support (not shown).

The linear movement of actuating arm 708 may be applied by a solenoid 710 or by some other driving mechanism. This driving mechanism may be remotely located from the light path, which may allow for greater design flexibility.

The shutter assembly 700 of this embodiment may provide for a low moment of inertia due, at least in part, to the linear actuating method and the distribution of mass resulting from the shutters 704 being coupled to multiple rotational axes.

This may, in turn, facilitate rapid changes between orientation states of the shutters 704, to further accommodate rapidly changing scenes.

Figure 8:
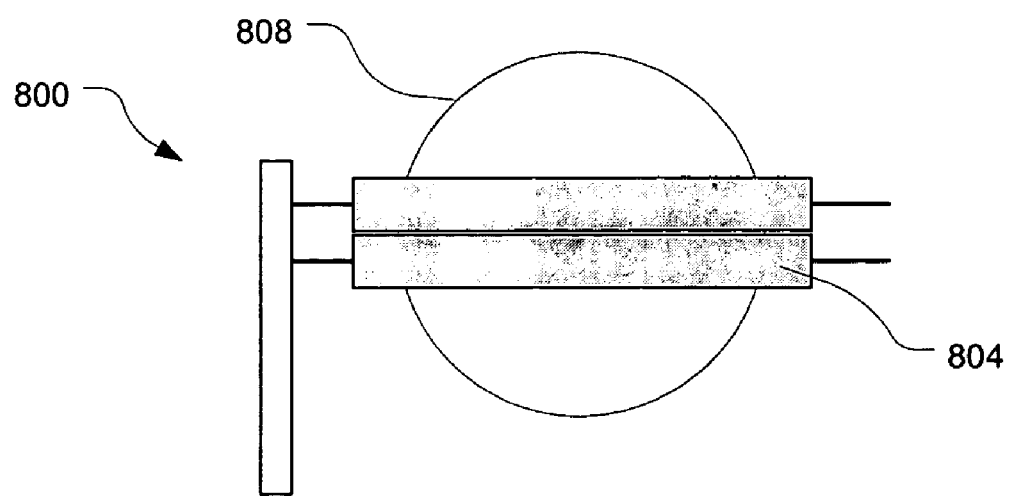
FIG. 8 illustrates a front plan-view of an optical shutter assembly, in accordance with an embodiment of the present invention.

In some embodiments, certain portions of a pupil may have a greater light intensity than others. In these embodiments, it may be desirable to focus resources on the portions of the pupil providing the greatest return. FIG. 8 illustrates a front plan view of an optical shutter assembly 800 in accordance with an embodiment of the present invention. In this embodiment, the optical shutter assembly 800 includes two shutters 804, in the light-blocking orientation, that are positioned around an axis of a pupil 808. In this embodiment, the pupil 808 may have a greater brightness at the center. Therefore, placing the two shutters 804 around this axis may provide a sufficient luminance reduction, without having to use additional shutters.

In various embodiments, the location and design of the shutters may be adjusted to accommodate motivations and objectives of the particular application. For example, another embodiment may have shutters only at the periphery of the pupil.

In certain projection devices, the pupil of the projection optics may not only be filled with image-bearing light, but also with some portion of scattered light. This scattered light may result from unintended specular, or flat-state, reflection off of components in the projection device. This scattered light could raise the black levels of the image and thereby decrease the overall contrast ratio. In some embodiments, this scattered light may tend to fill certain areas of the pupil more than others. Therefore, an optical shutter may be positioned over these areas in order to block the scattered light first, which could potentially increase the contrast ratio of the image.

Figure 9:
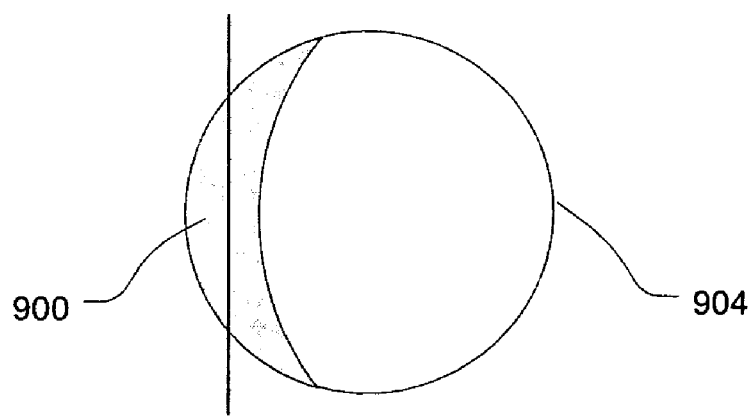
FIG. 9 illustrates a front plan-view of a crescent-shaped optical shutter, in accordance with an embodiment of the present invention.

FIG. 9 illustrates a front plan view of an optical shutter 900 adapted to primarily block the scattered light of a pupil 904, in accordance with an embodiment of the present invention. In one embodiment, for example, a projection device with a DMD light valve, the unintended specular reflection may tend to occupy a crescent-shaped portion of the pupil 904. In this embodiment, the optical shutter 900 may be designed to complement the asymmetrical shape of the specular portion of the pupil 904.

In bright images, the scattered light may add additional luminance resulting in an overall brighter image. Therefore, in one embodiment the shutter 900 may be positioned in a light-passing orientation during these images. However, other scenes may benefit from the shutter 900 blocking at least a portion of this light to potentially increase the overall contrast of the image.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. An apparatus comprising:
   a light source adapted to provide light along an illumination path;
   a light valve adapted to receive the light along the illumination path, to modulate the light, and to direct the modulated light along a projection path; and
   a shutter assembly having one or more shutters with a crescent shape, the one or more shutters having a rotational axis within and orthogonal to either the illumination path or the projection path.

2. The apparatus of claim 1, wherein the one or more shutters are disposed in a first area of a pupil having a greater intensity of specular reflection than a second area of the pupil.

3. The apparatus of claim 1, wherein each of the one or more shutters having a respective rotational axis within and orthogonal to either the illumination path or the projection path.

4. The apparatus of claim 1, further comprising:
   an arm coupled to the one or more shutters and adapted to collectively rotate the one or more shutters around their respective rotational axes from a first orientation to a second orientation.

5. The apparatus of claim 4, wherein the first orientation is a light-transmission orientation and the second orientation is a light-blocking orientation.

6. The apparatus of claim 1, further comprising
   illumination optics disposed in the illumination path having a first pupil;
   projection optics disposed in the projection path having a second pupil; and
   the rotational axes of the one or more shutters being positioned at or near the second pupil.

7. The apparatus of claim 6, wherein the second pupil comprises a first section with a first light intensity and a second section with a second light intensity; and
   the one or more shutters are positioned at the first section.

8. The apparatus of claim 7, wherein the first light intensity comprises a first amount of scattered light, and the second light intensity comprises a second amount of scattered light that is less than the first amount of scattered light.

9. The apparatus of claim 7, wherein the first light intensity is greater than the second light intensity.

10. The apparatus of claim 6, wherein the one or more shutters substantially fill the second pupil.

11. A method comprising:
    providing light along an illumination path;
    modulating the light with a light valve;
    directing the modulated light along a projection path; and
    rotating one or more shutters with a crescent shape of a shutter assembly around respective rotational axes within and orthogonal to either the illumination path or the projection path.

12. The method of claim 11, further comprising:
    receiving image data;
    determining an image brightness value based, at least in part, on the image data;
    comparing the image brightness value to a threshold value; and
    collectively rotating the one or more shutters around their respective rotational axes when the image brightness value is less than the threshold value.

13. The method of claim 11, wherein said rotating the one or more shutters further comprises:
    rotating the one or more shutters from a light-transmitting orientation to a light-blocking orientation.

14. The method of claim 11, wherein said rotating the one or more shutters comprises:
    mechanically actuating an arm coupled to the one or more shutters.

15. The method of claim 11, wherein the rotational axes are substantially parallel to one another.

16. A system comprising:
a controller adapted to receive an image signal and to output a light valve control signal representing an image;
a light source adapted to provide light along an illumination path;
a light valve optically coupled to receive the light along the illumination path and further coupled to receive the light valve control signal from the controller, the light valve being adapted to modulate the light based, at least in part, on the light valve control signal and to direct the modulated light along a projection path; and
a shutter assembly having one or more shutters with a crescent shape, each having a respective rotational axis within and orthogonal to either the illumination path or the projection path.

17. The system of claim 16, further comprising:
a projection lens, on the projection path, adapted to receive and project the modulated light.

18. The system of claim 16, wherein the controller is further adapted
to determine an image brightness value based, at least in part, on the image data;
to compare the image brightness value to a threshold value; and
to generate an actuating control signal adapted to cause the one or more shutters to collectively rotate.

19. The system of claim 16, further comprising:
an input device coupled to the controller and adapted to transmit the image signal to the controller.

20. The system of claim 19, wherein the input device is selected from a group consisting of a digital versatile disk (DVD), a set-top box, and an integrated television tuner.

21. The system of claim 16, wherein the system further comprises:
illumination optics disposed in the illumination path having a first pupil;
projection optics disposed in the projection path having a second pupil; and
the rotational axes of the one or more shutters being positioned at the second pupil.

22. The system of claim 21, wherein the one or more shutters substantially fill the second pupil.

* * * * *

UNITED STATES PATENT AND TRADEMARK OFFICE
CERTIFICATE OF CORRECTION

| | | |
|---|---|---|
| PATENT NO. | : 7,413,313 B2 | Page 1 of 1 |
| APPLICATION NO. | : 10/987867 | |
| DATED | : August 19, 2008 | |
| INVENTOR(S) | : Mark D. Peterson | |

It is certified that error appears in the above-identified patent and that said Letters Patent is hereby corrected as shown below:

Column 8

Line 15, "...4. The apparatus of claim 1,..." should read --...4. The apparatus of claim 3,...--.

Line 23, "...6. The apparatus of claim 1,..." should read --...6. The apparatus of claim 3,...--.

Signed and Sealed this

Twenty-second Day of September, 2009

David J. Kappos
*Director of the United States Patent and Trademark Office*